US008845402B2

(12) United States Patent
Janssen

(10) Patent No.: US 8,845,402 B2
(45) Date of Patent: Sep. 30, 2014

(54) DEVICE AND METHOD FOR REMOVING A POULTRY BREAST GRISTLE

(75) Inventor: Jörg Janssen, Rastede (DE)

(73) Assignee: Marel Stork Poultry Processing B.V., Boxmeer (NL)

(*) Notice: Subject to any disclaimer, the term of this patent is extended or adjusted under 35 U.S.C. 154(b) by 256 days.

(21) Appl. No.: 13/516,286

(22) PCT Filed: Dec. 17, 2010

(86) PCT No.: PCT/DE2010/001487
§ 371 (c)(1),
(2), (4) Date: Jul. 30, 2012

(87) PCT Pub. No.: WO2011/072660
PCT Pub. Date: Jun. 23, 2011

(65) Prior Publication Data
US 2012/0282850 A1 Nov. 8, 2012

(30) Foreign Application Priority Data
Dec. 17, 2009 (DE) .................... 20 2009 017 070 U

(51) Int. Cl.
*A22C 17/00* (2006.01)
*A22C 21/00* (2006.01)
(52) U.S. Cl.
CPC .................................. *A22C 21/0069* (2013.01)
USPC ........................................................ 452/136
(58) Field of Classification Search
USPC .................. 452/149–153, 155–157, 136
See application file for complete search history.

(56) References Cited

U.S. PATENT DOCUMENTS

| 3,130,445 A | 4/1964 | Segur |
| 3,541,634 A | 11/1970 | Panek |
| 3,665,553 A | 5/1972 | Colosky |
| 3,889,317 A | 6/1975 | Boyd, Jr. |
| 4,557,017 A | 12/1985 | Gasbarro |
| 5,098,337 A | 3/1992 | Landt et al. |
| 5,336,127 A * | 8/1994 | Hazenbroek ............... 452/160 |
| 6,283,847 B1 | 9/2001 | Berry et al. |
| 6,572,467 B1 * | 6/2003 | Hirokane .................. 452/135 |
| 8,292,703 B2 * | 10/2012 | Van Den Nieuwelaar et al. ...................... 452/136 |

FOREIGN PATENT DOCUMENTS

| CN | 85 1 02351 A | 10/1986 |
| CN | 85 1 02729 A | 10/1986 |
| CN | 85 1 04632 A | 12/1986 |
| CN | 1368009 A | 9/2002 |
| EP | 0 168 865 B1 | 12/1987 |
| EP | 0 429 887 B1 | 2/1993 |

* cited by examiner

*Primary Examiner* — Richard Price, Jr.
(74) *Attorney, Agent, or Firm* — Birch, Stewart, Kolasch & Birch, LLP

(57) ABSTRACT

A device for removing a breast gristle from a poultry breast carcass includes a transport apparatus for moving the breast carcass along a straight motion path in a fixed orientation. A median plane of the breast carcass is oriented perpendicularly to the motion path. A stationary cutting apparatus has a transversal blade, for making a transversal cut passing through the breast gristle, the transversal cut extending in a transversal cut plane arranged perpendicularly to the median plane. The transversal cut plane and a transversal plane of the breast carcass are arranged perpendicularly to the median plane and include an angle up to 30°. A frontal blade is provided for making a frontal cut passing through the breast gristle. The frontal cut plane and a frontal plane of the breast carcass are arranged perpendicularly to the median plane and perpendicularly to the transversal plane include an angle up to 30°.

20 Claims, 15 Drawing Sheets

DEVICE AND METHOD FOR REMOVING A POULTRY BREAST GRISTLE

The invention relates to a device for removing breast cartilage from a poultry breast carcass.

The breast cartilage (Engl. "keel bone"), which in the case of poultry forms the extension of the breastbone, is needed by the pharmaceutical industry as raw material for the recovery of chondroitin sulfate and sodium hyaluronate and other medicinally valuable amino acids.

As a rule, the separating and collecting of the small pieces of cartilage weighing only a few grams is expensive manual work such that not all theoretically recoverable pieces of breast cartilage are actually recoverable and the demand outstrips the available amount by a multiple.

Poultry stripping is extensively automated in Europe and is effected for the most part by machines where in a first step for separating the breast fillet from the poultry body, the entire breast piece with bones (sternum, breast cartilage and costal arches) is separated off and the breast piece is clamped in a further automatic stripping machine. In said machine, the breast piece is pulled through the stripping device by a conveyor. In the case of the conveying speeds usually applied, for example approximately 15 km/h, it is impossible to recover the breast cartilage by hand.

The object of the invention is to propose a device by way of which the breast cartilage can be separated from a breast piece without slowing down the conveying speed of the breast piece or having to hold the breast piece again in another device.

This object is achieved as claimed in the invention by a device for removing breast cartilage from a poultry breast carcass, said device having a conveying device for moving the breast carcass along a straight, in particular horizontal path of motion in a fixed orientation, wherein a median plane of the breast carcass is aligned perpendicularly with respect to the path of motion, a positionally fixed cutting device having a transversal blade for carrying out a transversal cut, which passes through the breast cartilage and extends in a transversal cutting plane arranged perpendicularly to the median plane, wherein the transversal cutting plane encloses an angle of up to 30° with a transversal plane of the breast carcass which transversal plane is arranged perpendicularly with respect to the median plane, and having a frontal blade for carrying out a frontal cut which passes through the breast cartilage and extends in a frontal cutting plane arranged perpendicularly with respect to the median plane, wherein the frontal cutting plane encloses an angle of up to 30° with a frontal plane of the breast carcass which frontal plane is arranged perpendicularly with respect to the median plane (20) and perpendicularly with respect to the transversal plane.

As a result of the predetermined orientation of the positionally fixed cutting device in comparison with the moved breast carcass, the two blades, the transversal and the frontal blade, are able to cut the breast cartilage from the breastbone in a defined manner without any unwanted contact between the transversal and/or frontal blade and the conveying device or other parts such as meat or bones of the breast carcass.

According to the definition, the transversal and frontal planes extend perpendicularly with respect to the median plane of the breast carcass and perpendicularly with respect to each other, it not being necessary, however, for the transversal and frontal cutting planes to be necessarily perpendicular with respect to each other.

Preferably, the transversal blade and/or the frontal blade is (are) plane. In addition, it is preferred that the transversal blade and/or the frontal blade is (are) realized in a straight manner. The transversal blade extends preferably manner in the transversal cutting plane. Also the further transversal blade extends preferably in the transversal cutting plane. The frontal blade extends preferably in the frontal cutting plane.

In addition, it can be provided that the transversal blade and/or the frontal blade is (are) arranged at an acute angle with respect to the path of motion, in particular at an angle of up to 10°, 15° or 20° with respect thereto.

The transversal blade and the frontal blade can extend from a tip pointing in opposition to the direction of movement. In this case, it can be envisaged that a start region adjacent the tip (up to 10%, 20% or 30% of an overall length, starting with the tip, of the respective blade of the transversal blade and/or of the frontal blade is obtuse. An acute angle enclosed between the start regions of the transversal and frontal blades can be between 5° and 30°, preferably between 10° and 20°.

The invention provides preferably that the transversal blade has associated therewith a further transversal blade, which is opposite said transversal blade, for carrying out a further transversal cut, in particular in the transversal cutting plane. The further transversal blade can be realized as a rotating cutting blade or as a rigidly held cutting blade, for instance as a cutting blade arranged converging with the transversal blade at an acute angle in the direction of movement of the breast carcass.

In a further development of the invention it can be envisaged that a mechanical entrainment means and/or scraper for moving breast cartilage, separated completely or in part from the breast carcass, in the direction of movement of the breast carcass and/or for scraping the transversal blade is arranged over and/or under the transversal blade.

The entrainment means or scraper can be coupled to a drive element which is arranged above the transversal blade and is movable by the conveying device or by the breast carcass which is moved by said conveying device.

In a preferred embodiment it is envisaged that the drive element and the entrainment means each have radially extending arms and are rotatably mounted.

As an alternative or in addition to the entrainment means, a scraper, which scrapes the transversal blade or further transversal blade after each cutting operation, can be provided above and/or below the transversal blade or the further transversal blade, in an expedient manner in opposition to the direction of movement of the breast carcass.

The invention also relates to a method for removing breast cartilage from a poultry breast carcass, in particular using a device as claimed in the invention, where the breast carcass is moved along a straight, in particular horizontal path of motion and a median plane of the breast carcass is aligned perpendicularly with respect to the path of motion, a positionally fixed cutting device having two blades is provided, and by interaction between the moved breast carcass and the positionally fixed cutting device, a transversal cut is carried out which extends through the breast cartilage and extends in a transversal cutting plane arranged perpendicularly with respect to the median plane, wherein the transversal cutting plane encloses an angle of up to 30° with a transversal plane of the breast carcass which transversal plane is arranged perpendicularly with respect to the median plane, and a frontal cut is carried out which extends through the breast cartilage and extends in a frontal cutting plane arranged perpendicularly with respect to the median plane, wherein the frontal cutting plane encloses an angle of up to 30° with a frontal plane of the breast carcass which frontal plane is arranged perpendicularly with respect to the median plane and perpendicularly with respect to the transversal plane, wherein at least part of the breast cartilage is separated from the breast carcass.

Preferably, a frontal plane of the breast carcass is aligned vertically, or within an angular range of up to 10°, 15°, 20° or 30° with respect to the vertical.

The transversal cut can be carried out preferably in the sagittal direction extending horizontally forward.

The frontal cut can be carried out preferably in the vertical direction extending downward.

Preferably it is envisaged that the transversal cut and the frontal cut extend from a common starting point or a common starting line.

It is preferably envisaged that there is carried out a further transversal cut, which extends in the opposite direction to the transversal cut and can extend in the same plane as the transversal cut.

A transversal cut, a frontal cut and a further transversal cut can be carried out at the same time.

It is envisaged that preferably at least one of the transversal cut, frontal cut and further transversal cut is carried out progressively in a proportional manner with respect to a progression of movement of the breast carcass, in particular in comparison with or at a speed of 5%, 10%, 15%, 20%, 30%, 40% or 50% of a conveying speed of the breast carcass.

The invention is explained further below by way of an exemplary embodiment, reference being made to a drawing, in which.

Figure 1:
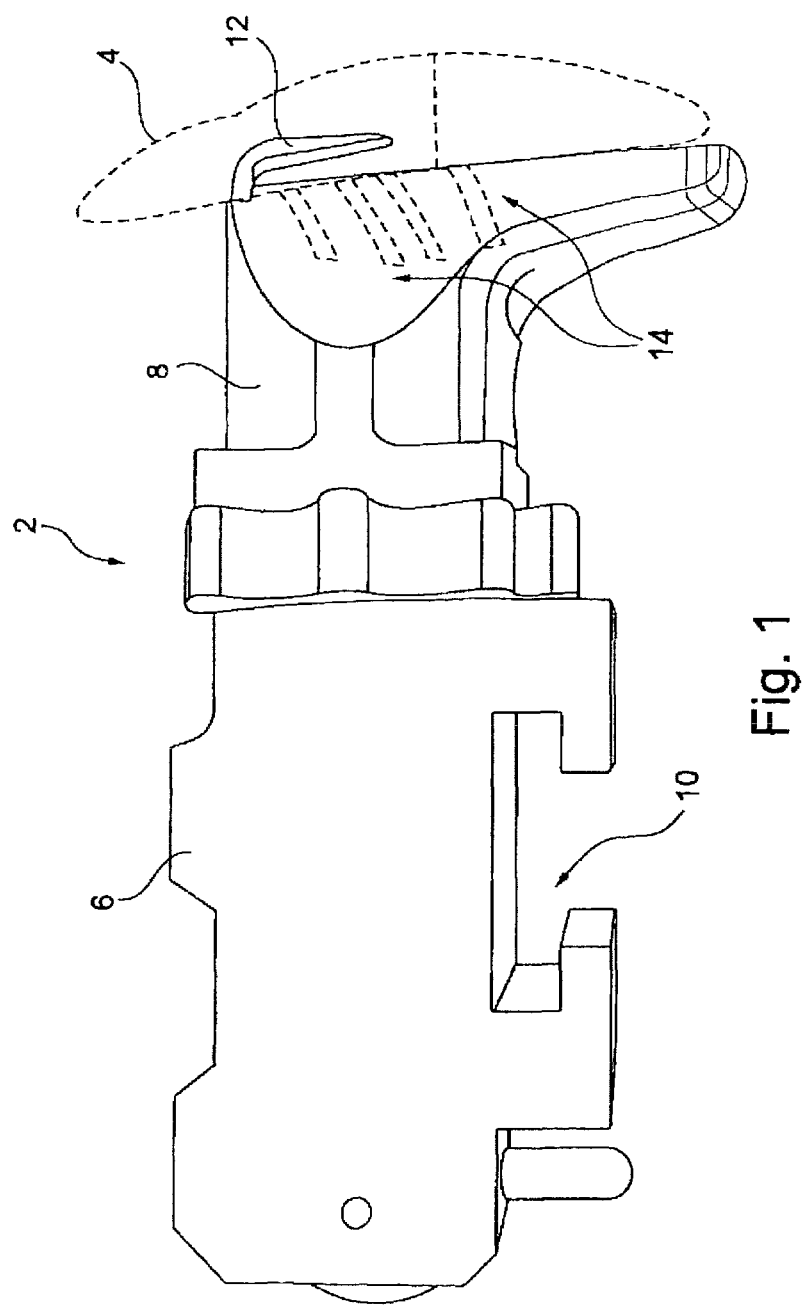
FIG. 1 shows a side view of a fixing element for a poultry breast carcass.
Figure 2:
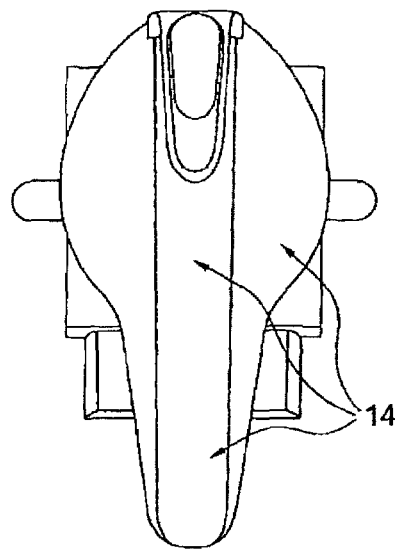
FIG. 2 shows a front view of the fixing element according to FIG. 1.
Figure 7:
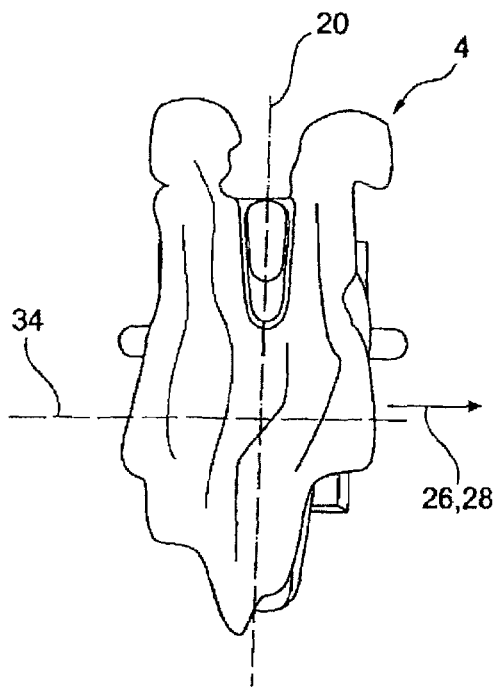
Figure 3:
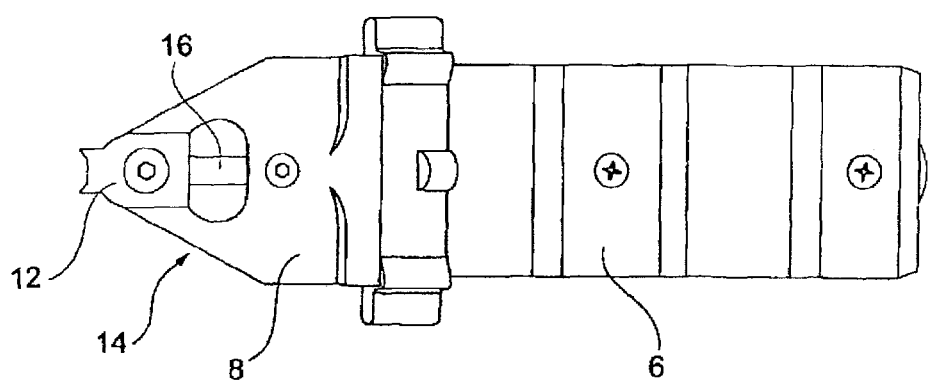
Figure 4:
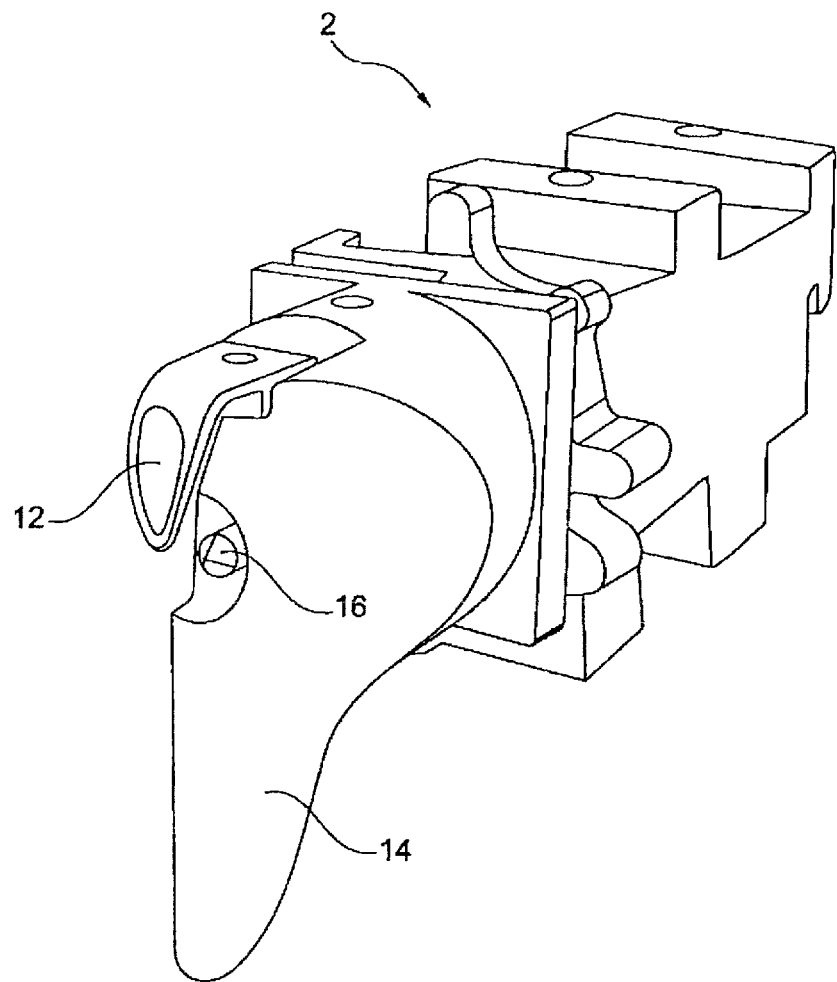
Figure 5:
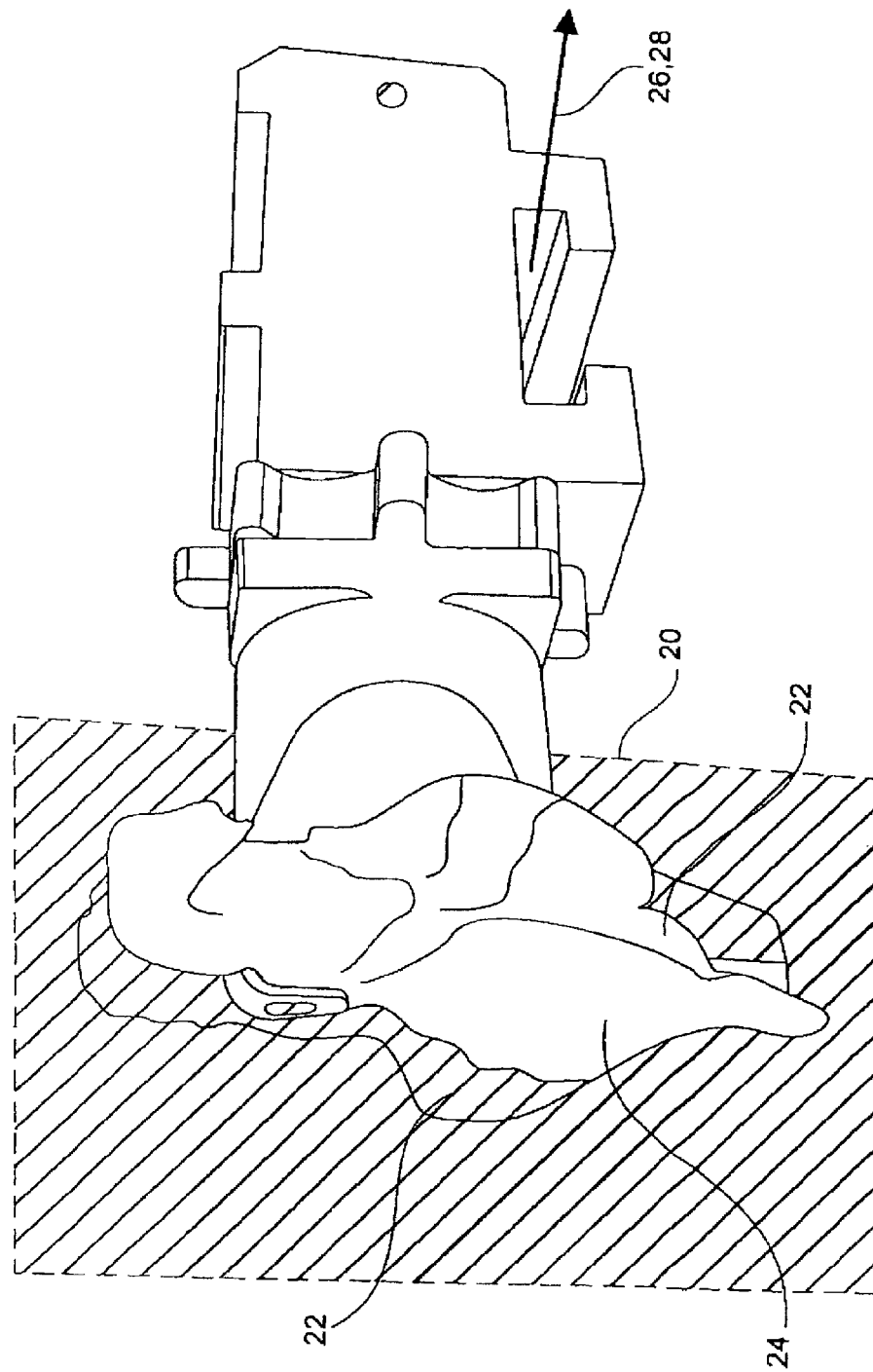
Figure 6:
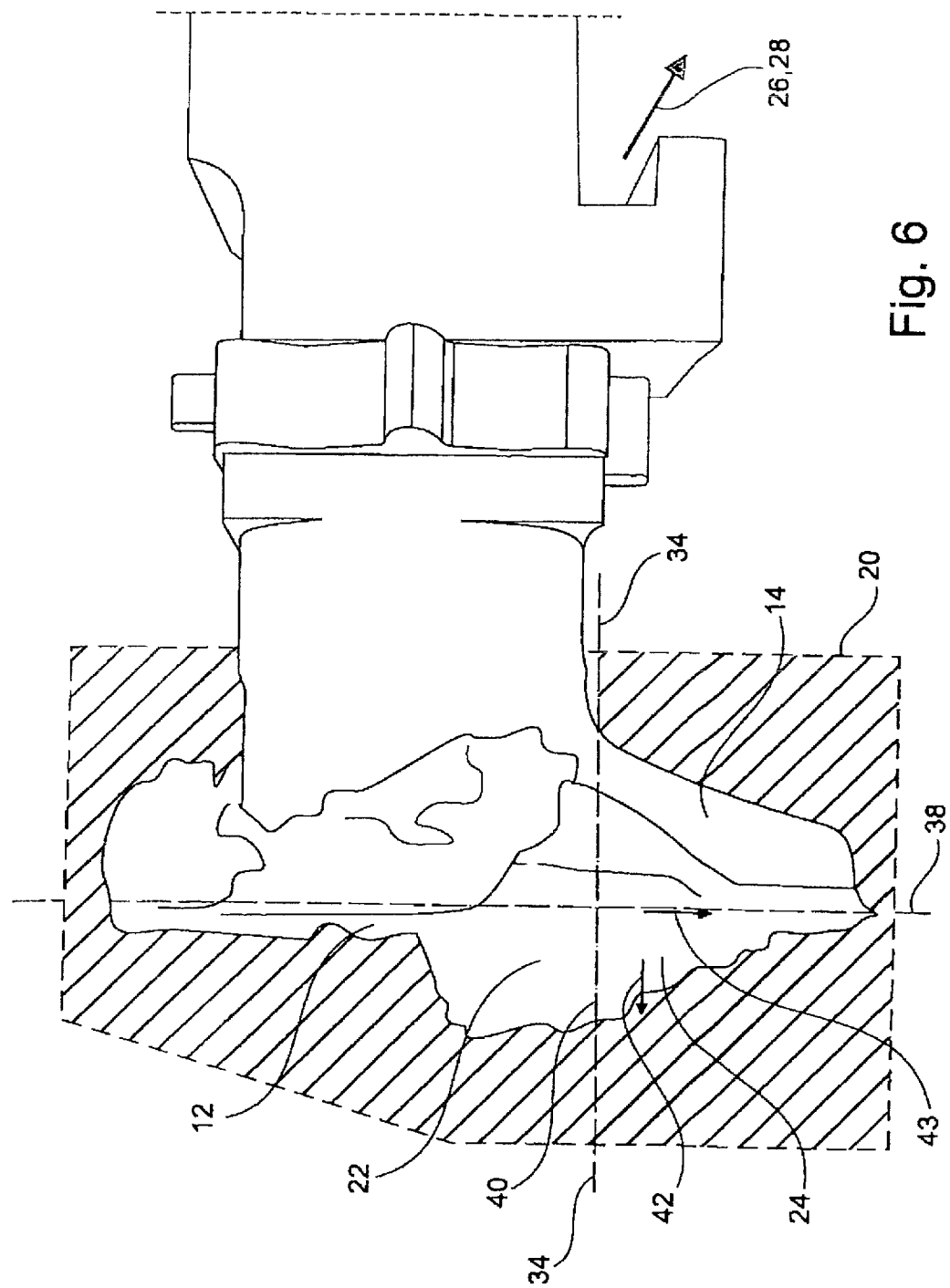
Figure 8:
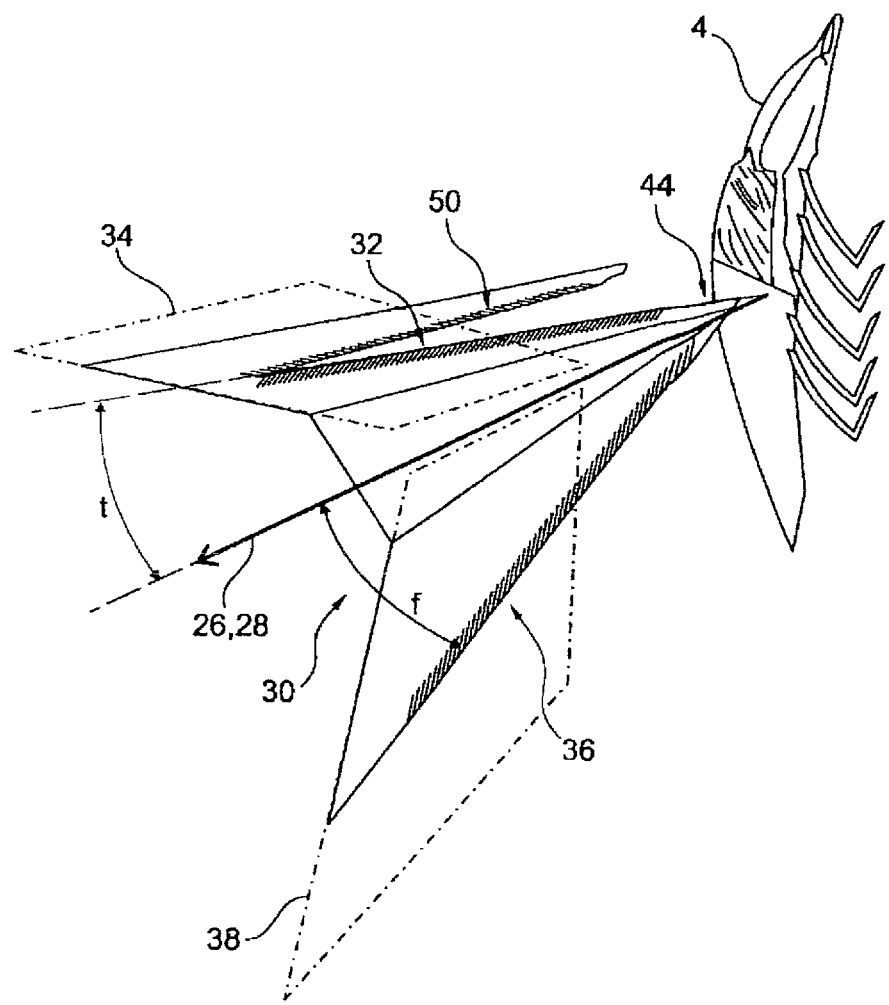
Figure 9:
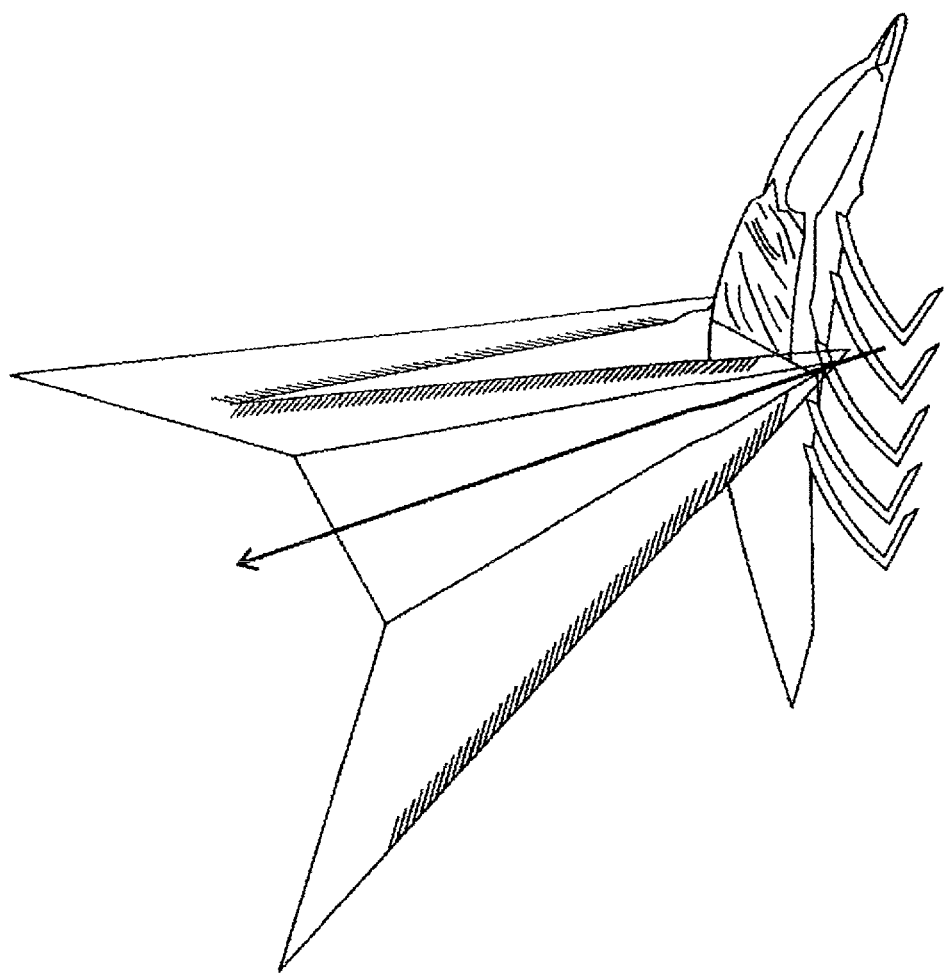
Figure 10:
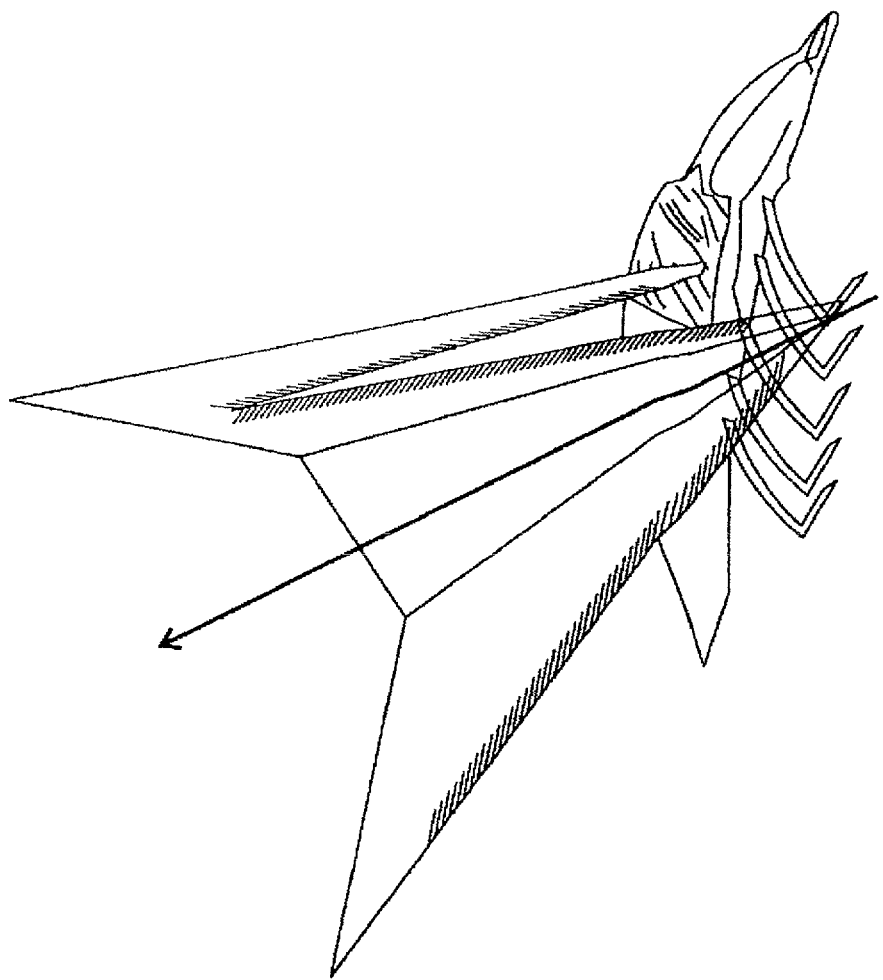
Figure 11:
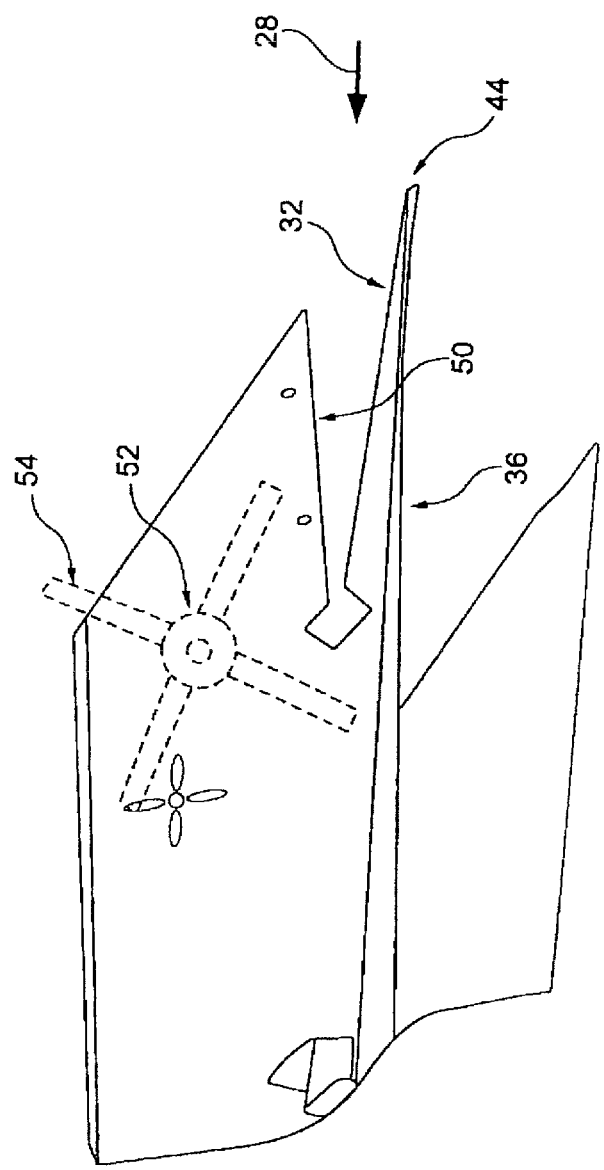
Figure 12:
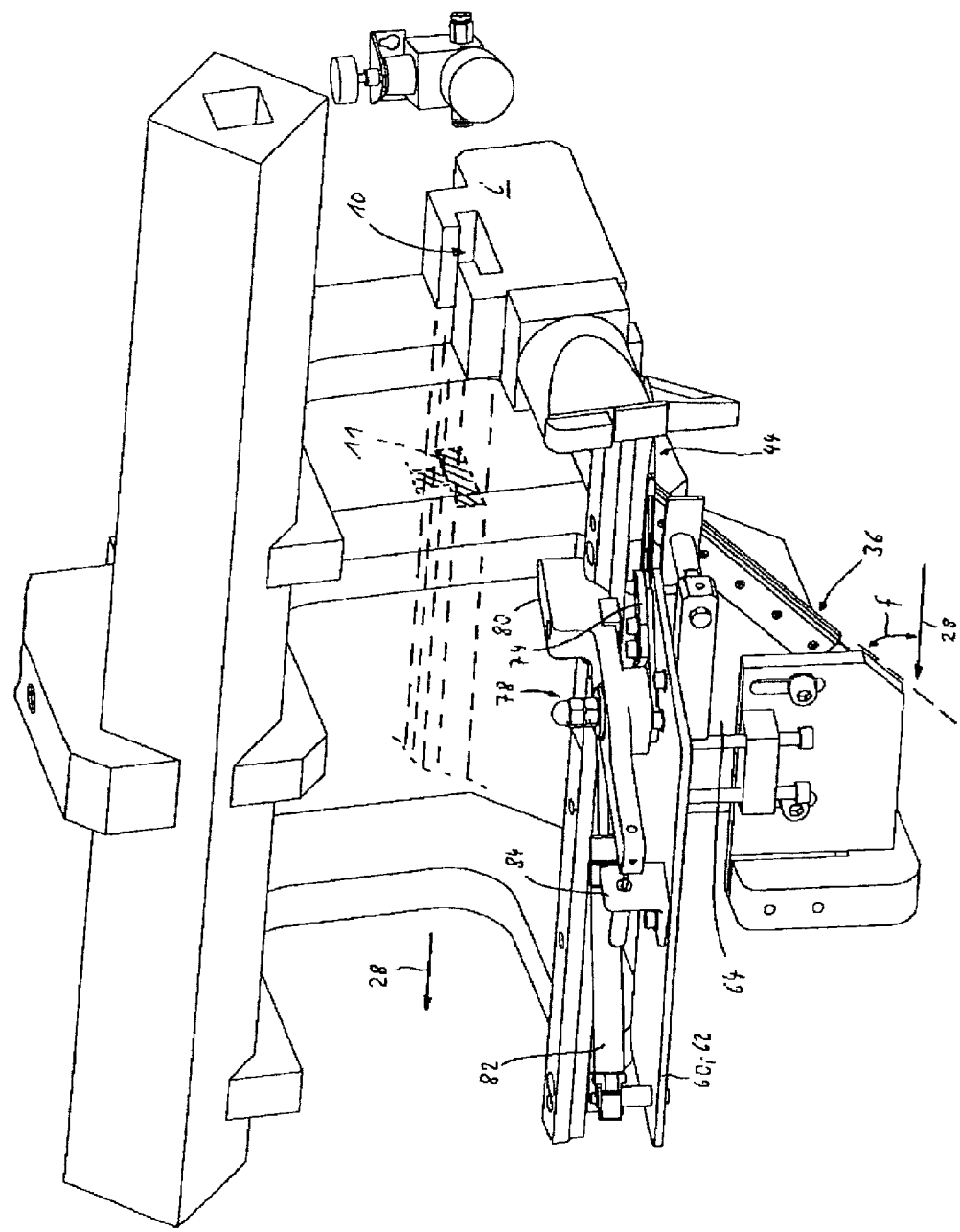
Figure 13:
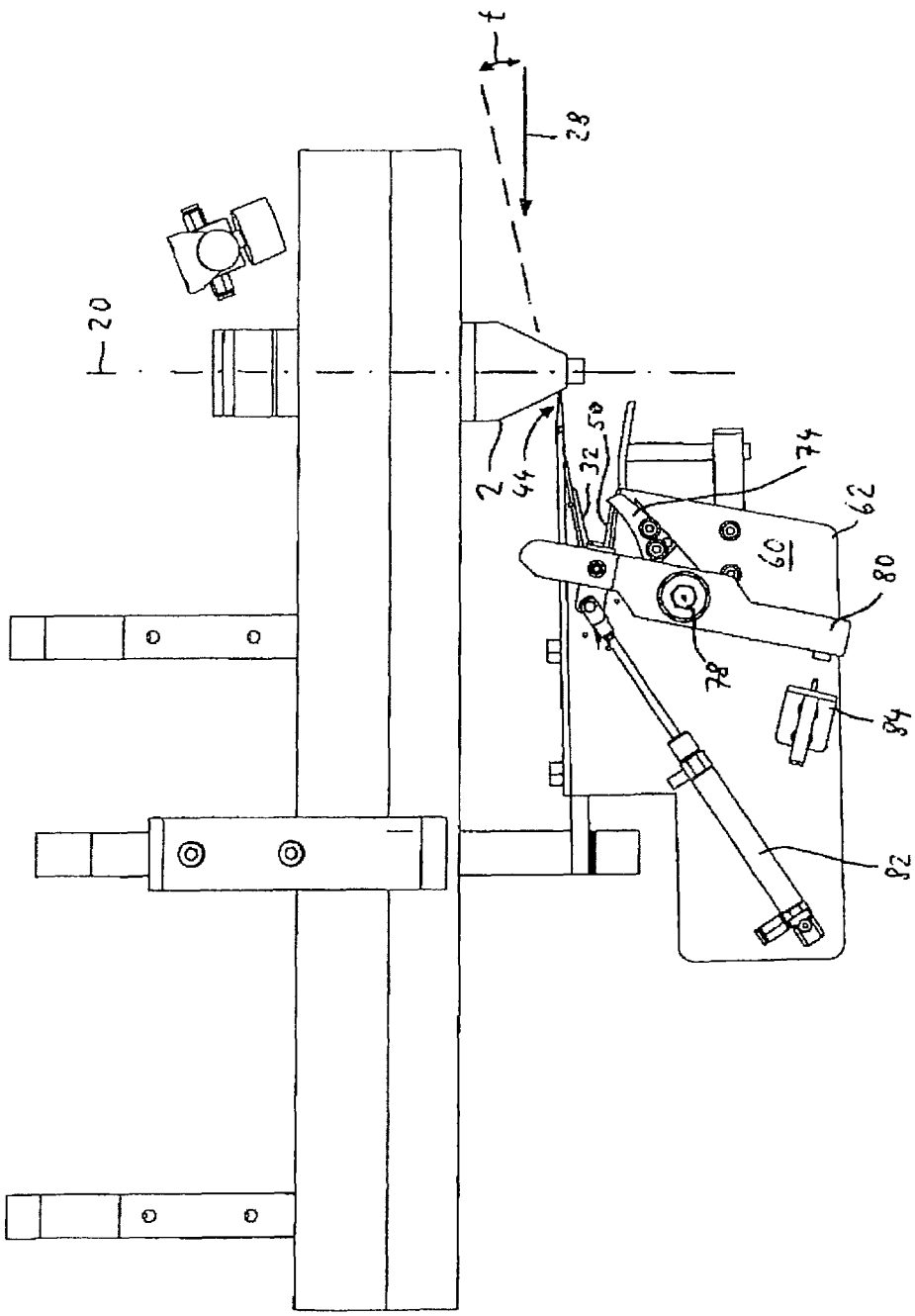
Figure 14:
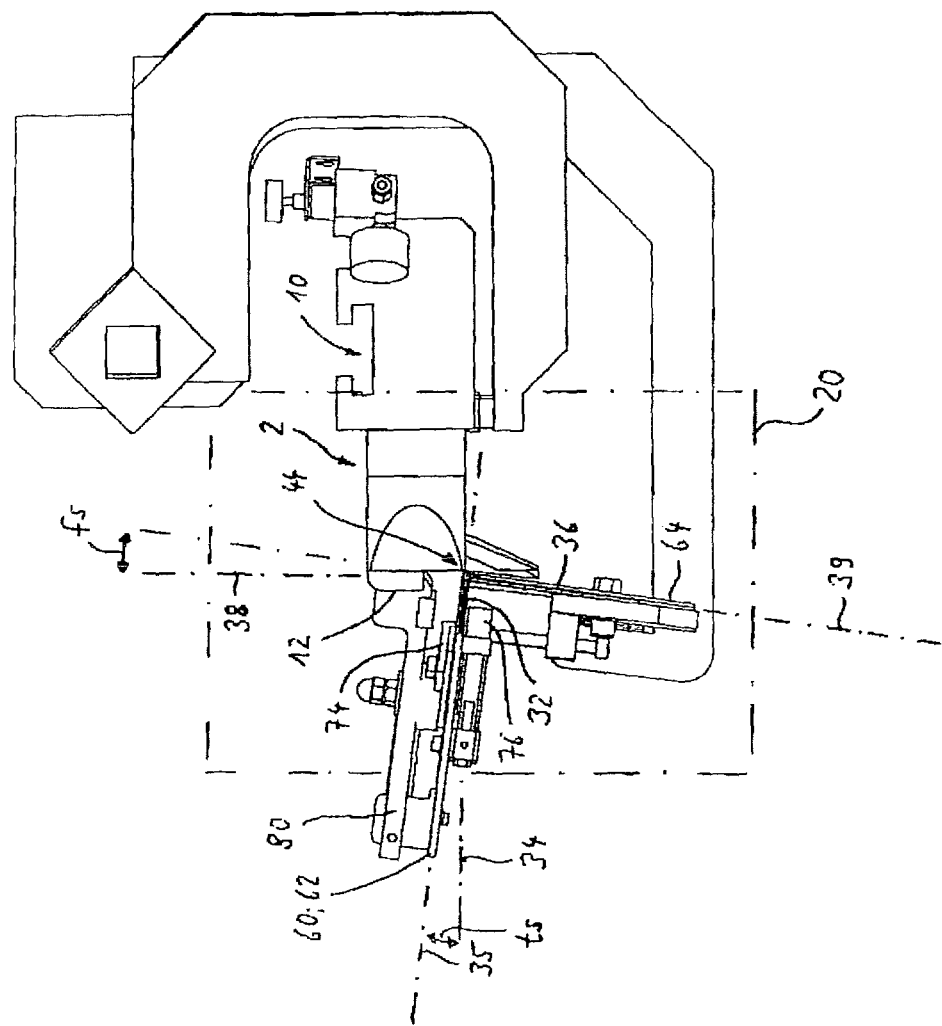
Figure 15:
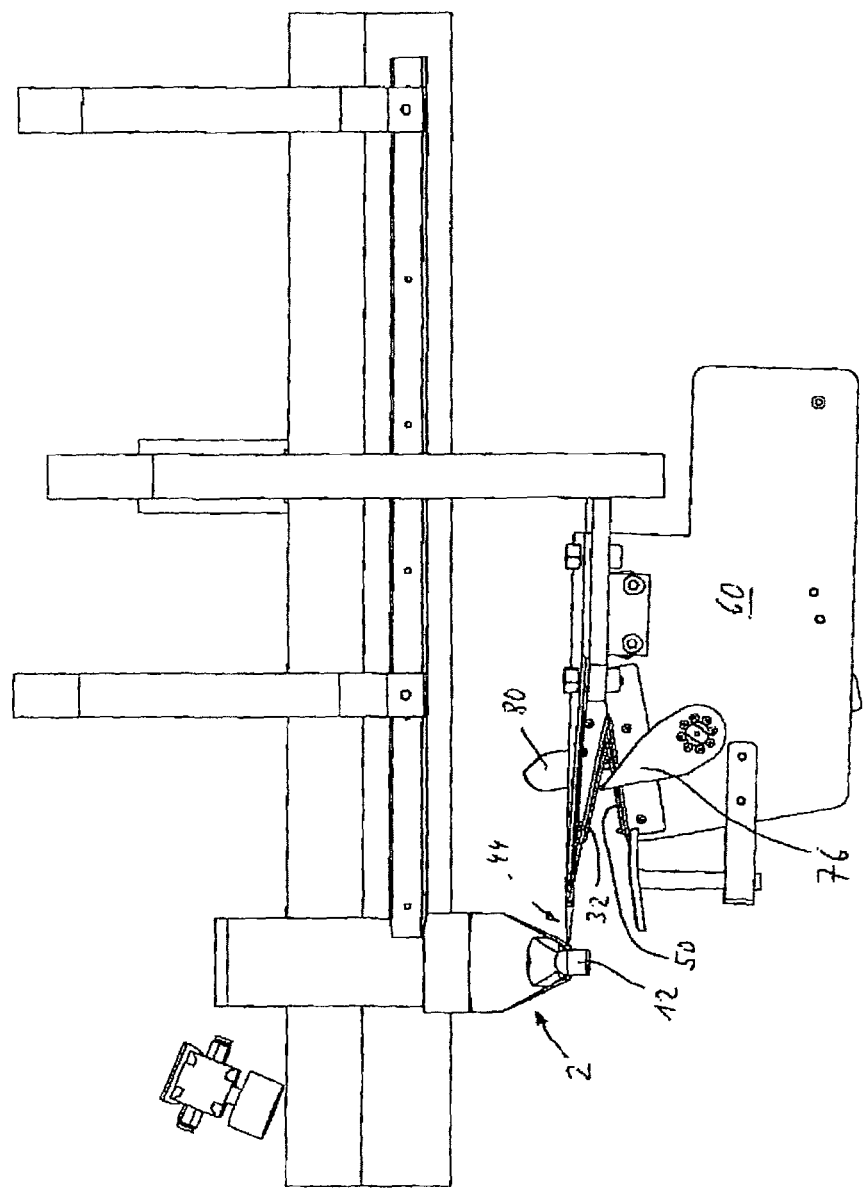

FIG. 3 shows a top view from above onto the fixing element according to FIGS. 1 and 2, FIG. 4 shows a perspective view inclinedly from the front onto the fixing element according to FIGS. 1 to 3, FIG. 5 shows a perspective view inclinedly from the front onto the fixing element according to FIGS. 1 to 4 with a poultry breast carcass held thereon, FIG. 6 shows a side view of the fixing element with a poultry breast carcass held thereon, FIG. 7 shows a front view of the poultry breast carcass held on the fixing element, FIG. 8 shows a perspective schematic representation of a cutting device prior to penetrating into a breast cartilage of a breast carcass, FIG. 9 shows the cutting device according to FIG. 8 immediately after penetrating into the breast cartilage, FIG. 10 shows the cutting device when cutting into the breast cartilage, FIG. 11 shows a perspective view of the cutting device, FIG. 12 shows a perspective view of a further embodiment of the invention, FIG. 13 shows a top view onto the embodiment according to FIG. 12, FIG. 14 shows a front view in the direction of movement of the embodiment according to FIGS. 12 and 13, FIG. 15 shows a view from below onto the embodiment according to FIGS. 12 to 14, FIG. 16 shows an exploded representation of essential elements of the embodiment according to FIGS. 12 to 15 and FIG. 17 shows a top view onto the cutting device of the embodiment according to FIGS. 12 to 16.

A conveying device for holding and moving poultry breast carcasses as well as the aligning and fixing of a poultry breast carcass on the conveying device is explained first of all with reference to FIGS. 1 to 7.

FIG. 1 shows a side view of a fixing element 2 for a poultry breast carcass 4, indicated by the broken line, having a guide portion 6 and a fixing portion 8. The guide portion 6 has an undercut guide groove 10 which is T-shaped in cross section, by way of which guide groove the fixing element 2 can be pulled on a guide rail of a conveying device realized with a corresponding cross section in order to convey the poultry breast carcass 4 held on the fixing portion 8 one after the other to different processing stations. The poultry breast carcass 4 is insertable between a hook-shaped projection 12 and an angled, suitably contoured contact surface 14 of the fixing portion 8 and can be fixed in a positive locking manner and with low play by a fixing journal 16 (FIG. 4) which can be pulled out in the direction of the projection 12, as FIG. 7 shows in comparison with FIG. 2.

In the position fixed on the fixing portion 8, shown in FIGS. 5 to 7, a median plane 20 of the poultry breast carcass 4 extends in a vertical manner and in the longitudinal direction of the fixing element 2, that is centrally through the contact surface 14, the fixing journal 16 and the projection 12. As the median plane of the poultry breast carcass is the plane which extends centrally though the backbone and breastbone as a plane of symmetry, a vertical alignment of the breastbone 22 and the breast cartilage 24 at the same time is ensured with this orientation. It can be seen that the median plane 20 extends perpendicularly with respect to a path of motion 26, along which the fixing element 2 moves forward in the conveying direction in a direction of movement 28.

As, in practice, a specific processing installation and conveying device always processes slaughtered animals of one and the same size, it is ensured that the breast carcasses 4 also always have the same dimensions such that fixing of the same on the fixing elements 2 can be effected in a reproducible manner and with low play. In a side view, FIG. 6 once again clearly shows the arrangement of breastbone 22 and breast cartilage 24 located directly adjacent a lower portion of the contact surface 14.

The device for separating off the breast cartilage as claimed in the invention is explained below with reference to FIGS. 8 to 11. A cutting device 30 arranged in a positionally fixed manner with reference to the conveying device and the moved fixing elements 2 is positioned such that the poultry breast carcasses, which are fixed on the fixing elements 2 moved forward along a predetermined path of motion, move in a forcible manner into engagement with the cutting device, as a result of which the breast cartilage is separated off in a targeted manner without the breast carcass being otherwise impaired in any other way.

The cutting device 30 has at least two blades for this purpose, namely first of all a transversal blade 32, which in the exemplary embodiment shown is arranged parallel to a transversal plane 34 (see also FIG. 7) of the breast carcass 4, and in addition a frontal blade 36 which is arranged parallel to a frontal plane 38 of the breast carcass 4. The transversal plane 34 extends perpendicularly with respect to the median plane 20 and, in the exemplary embodiment shown, runs in a substantially horizontal manner. The frontal plane 38 also extends perpendicularly with respect to the median plane 20 and in addition perpendicularly with respect to the transversal plane 34 and, in the exemplary embodiment shown, runs in a vertical manner. As the median plane 20 extends perpendicularly with respect to the path of motion 26 and to the direction of movement 28 of the carcass, the transversal and frontal planes 34, 38 each run parallel to the path of motion 26 and to the direction of movement 28.

Because variations are possible with reference to the shape of the breast cartilage and also with reference to the fixing of the breast carcass 4 on the fixing element 2, it can be expedient when the transversal blade 32 does not run precisely in the transversal plane 34, but in a transversal cutting plane extending at an angle thereto in order to be able to follow in a more precise manner, for example, a non horizontal, but inclinedly extending transition 40 (FIG. 6) between the breastbone 22 and the breast cartilage 24. In each case it is expedient when the transversal blade 32 runs in a plane parallel to the path of motion 26 so that when the breast carcass moves past the stationary blade, there is no height misalignment in a direction transversely with respect to the conveying movement.

In order to enable a gradual cutting operation in, for example, a sagittal direction 42, i.e. in a direction running in the median plane 20 and transversal plane 34, pointing away from the fixing element 2, the transversal blade 32 is arranged at an acute angle t with reference to the path of motion 26 or to the direction of movement 28.

The frontal blade 36 does not have to run precisely in the frontal plane 38 either, but can be arranged in a frontal cutting plane running at an angle thereto, also with the aim of compensating for certain deviations in the shape or fixing of individual breast carcasses. In order to obtain a gradual cutting progression in the downward direction 43 also in the region of the frontal blade 36 corresponding to the forward movement of the breast carcass, the frontal blade 36, just as the transversal blade 32, is arranged at an acute angle f with respect to the path of motion 26 or to the direction of movement 28 of the breast carcass 4.

The transversal blade 32 and frontal blade 36 are arranged such that they converge in a substantial manner at a point, proceeding from a tip 44 in the region of which they are comparatively obtuse. The tip 44 is positioned such that it penetrates into the breast cartilage or between the breast cartilage and the fixing element directly adjacent the breastbone at the level of the transition 40 between the breastbone and the breast cartilage such that from this point, the transversal blade 32 can carry out a substantially horizontal cut along the transition 40 in the direction 42 and the front blade 36 can carry out a substantially vertical cut between the breastbone and the breast cartilage in the direction 43.

The effect of the obtuse development of the blades in the region of the tip is that when the tip initially penetrates there is no cutting action, but the breast cartilage is raised or lifted off the fixing element in part due to the wedge effect of the tip and the subsequent cutting operation is simplified and improved.

FIG. 9 shows the first phase of the penetration of the tip between the breast cartilage and the breastbone or costal arch.

FIG. 10 shows the further cutting development, the sharp regions of the transversal and frontal blades now taking effect.

In order to simplify cutting off the breast cartilage completely, there is provided in an advantageous manner a further transversal blade 50 which is arranged in the plane of the transversal blade 32 and is also aligned at an acute angle with respect to the path of motion 26, although in the reverse orientation, such that between the two transversal blades 32, 50 a tapering, narrowing gap is formed into which the breast cartilage is moved on account of the movement of the breast carcass 4 and at the end of which it is cut off in a defined manner.

FIG. 11 shows a top view onto a cutting device 30 as claimed in the invention, it being possible to see the transversal and frontal blades 32, 36 arranged at an acute angle with respect to the path of motion 26, the tip 44 and the further transversal blade 50. Shown by the broken line is also a mechanical entrainment means 52 with arms 54 underneath the transversal blades 32, 50, the purpose of which is to move the breast cartilage, separated off substantially or completely, further in the direction of movement 28 each time a breast carcass moves past so that there is no jam in the region of the cutting device. The entrainment means 52 can be non-rotatably connected to a rotatable drive element, which is arranged above the transversal blade 32 and also has one or more radially extending arm or arms which (in each case) is (are) to be entrained by a passing breast carcass.

A further embodiment of the invention is explained below by way of FIGS. 12 to 17, said embodiment matching the previously explained embodiment in many respects such that the same references are used for the same elements.

The fixing element 2 with contact surfaces 14, the projection 12 of which is only indicated, is guided by way of its guide groove 10 on a guide rail 11, which is indicated by the broken line, the cross section of which (indicated in a hatched manner in FIG. 12) matches that of the guide groove 10.

Figure 17:
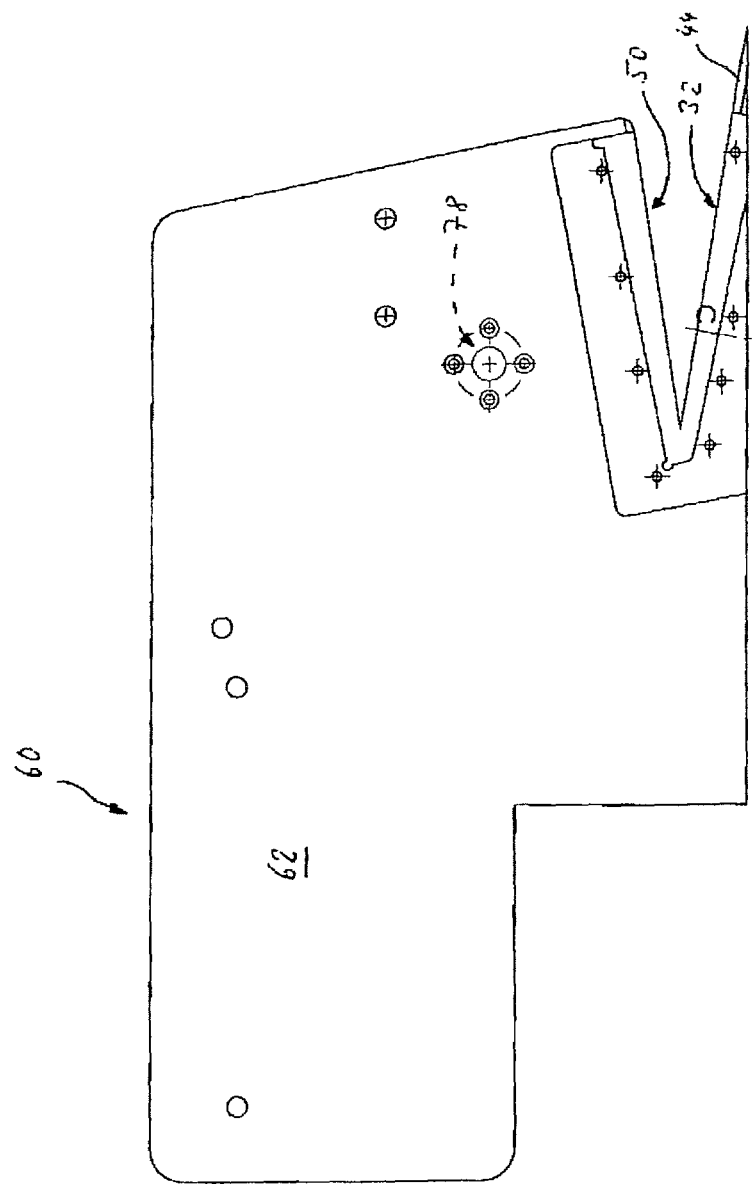

As shown by FIGS. 13, 15 and 17, there is provided a transversal blade 32 and a further transversal blade 50 arranged in the same plane, said blades being arranged at an acute angle at approximately 20° with respect to each other and at the same angles with respect to the direction of movement of the incoming breast carcasses or with respect to the longitudinal direction of the guide rail 11.

FIG. 13 clarifies the position of the median plane 20 which extends centrally through the fixing element 2 perpendicularly with respect to the plane of the drawing and perpendicularly with respect to the (horizontal) direction of movement 28. As shown in FIG. 14, in which the median plane 20 is also indicated along with the surface lying in the drawing plane, the transversal blade 32 and the further transversal blade 50 (not shown separately) extend in a transversal cutting plane 35 which is arranged perpendicularly with respect to the median plane 20. The transversal cutting plane 35 can enclose an angle is of up to 30°, in the present case for instance between 5 and 10°, with the transversal plane 34, which is fixed by the geometry of the breast carcass 4 and as a rule, extends in a horizontal manner.

The frontal blade 36 extends in a frontal cutting plane 39, which is arranged perpendicularly with respect to the median plane 20 and can enclose an angle fs of up to 30°, in the present case for instance between 5 and 10°, with the frontal plane 38, which is fixed by the geometry of the breast carcass 4 and extends perpendicularly with respect to the transversal plane 34, in the example shown, that is in a vertical manner.

As FIG. 14 further shows, the transversal blade 32 and the frontal blade 36 extend from the tip 44.

Figure 16:
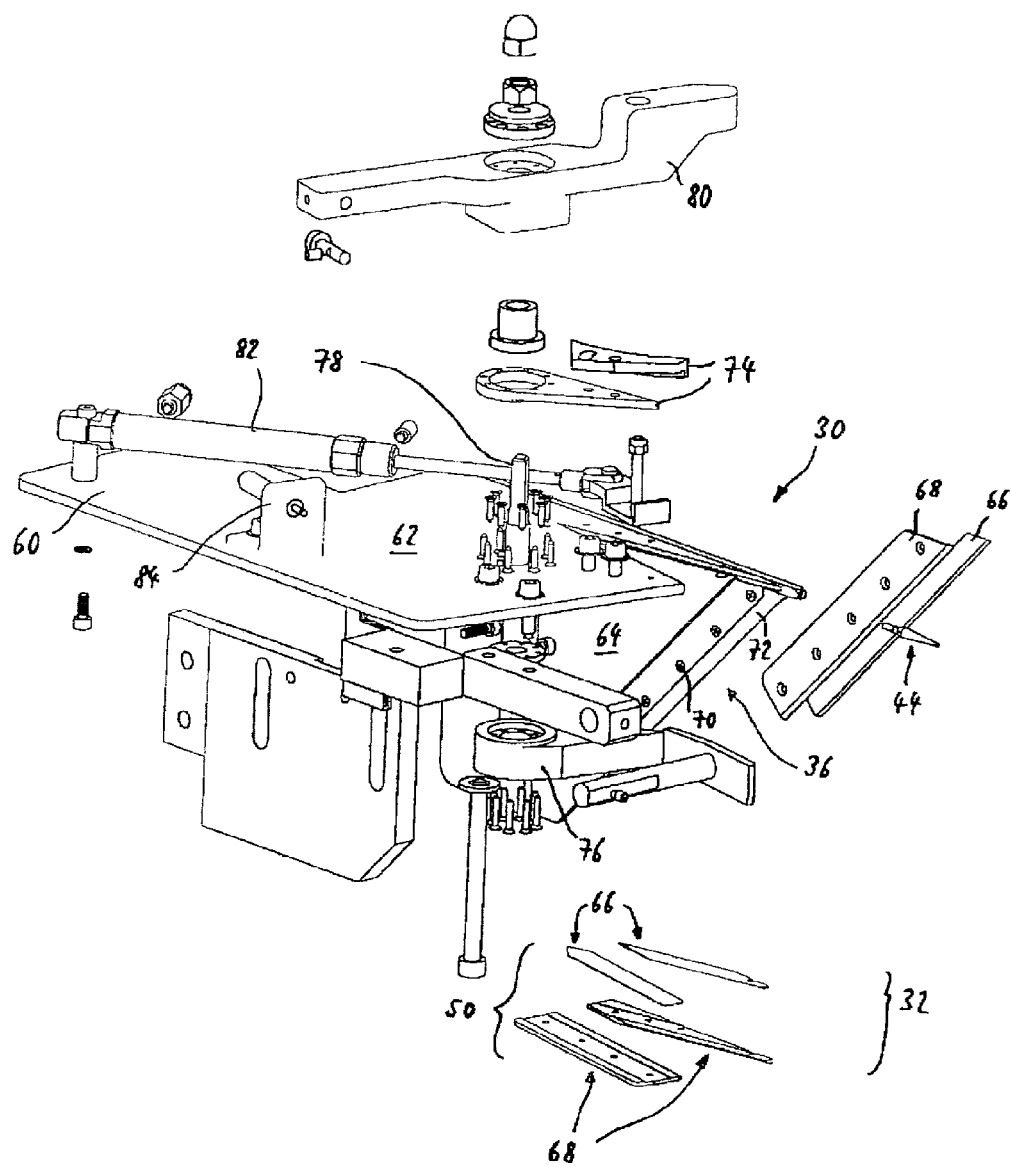

As can be seen in particular in FIG. 16, all the blades 32, 36 and 50 are mounted on a rectangular cutting body 60, which has an approximately horizontal portion 62, on which the transversal blade 32 and the further transversal blade 50 are mounted, and an approximately vertical portion 64, which proceeds therefrom and on which the frontal blade 36 is mounted. The tip 44 protrudes in opposition to the direction of movement 28 in the transition region between the horizontal and vertical portion 62, 64. All the blades are realized as interchangeable inserts or cutting blades which are fixed by clamping plates fastened on the cutting body 60 by screws so as to be easily exchangeable. FIG. 16 shows this for the frontal blade 36, which is formed as an insert 66 which is held so as to be interchangeable on the vertical portion 64 by a clamping plate 68 and screws 70, as well as the transversal blades 32, 50. The position of the respective insert, in this case, is fixed precisely by a recess in an outside edge of the respective portion, for instance by a recess 72 in the vertical portion 64.

An upper scraper 74 and a lower scraper 76 are held on the horizontal portion 62 of the cutting body 60 so as to be non-rotatable on a scraper shaft 78 which is rotatably mounted perpendicularly with respect to the transversal cutting plane 35. In addition, an actuating lever 80 is non-rotatably mounted on the scraper shaft 78, said actuating lever, on the arrival of a fixing element 2 or a breast carcass 4, is pivoted by the same and at the same time entrains the scrapers 74, 76 such that they are moved along above and below the transversal blade 32 and the further transversal blade 50 and first of all strip past them in the direction of movement 28. In this case, any possibly adhering residual meat is scraped off, and in addition the scraper 74 and/or the scraper 76 fulfill an entrainment function as in the case of the first embodiment in order to move the breast cartilage along the blades and to avoid adherence.

Pivotally connected on the actuating lever 80 is a spring-loaded pressure cylinder 82, which moves the actuating lever 80 back into the initial position after a fixing element 2 or a breast carcass 4 has passed through (seen clockwise in FIG. 13), until the actuating lever 80 bears against a stop 84 which is fixed to the cutting body. In this case, once the breast carcass has passed through, the scrapers are moved in opposition to the direction of movement 28 and once again strip the transversal and further transversal blades.

| List of references | |
| --- | --- |
| 2 | Fixing element (conveying device) |
| 4 | Poultry breast carcass |
| 6 | Guide portion |
| 8 | Fixing portion |
| 10 | Guide groove |
| 11 | Guide rail |
| 12 | Projection |
| 14 | Contact surface |
| 16 | Fixing journal |
| 20 | Median plane |
| 22 | Breastbone |
| 24 | Breast cartilage |
| 26 | Path of motion |
| 28 | Direction of movement |
| 30 | Cutting direction |
| 32 | Transversal blade |
| 34 | Transversal plane |
| 35 | Transversal cutting plane |
| 36 | Frontal blade |
| 38 | Frontal plane |
| 39 | Frontal cutting plane |
| 40 | Transition |
| 42 | Sagittal direction |
| 43 | Downward direction |
| 44 | Tip |
| 50 | Further transversal blade |
| 52 | Entrainment means |
| 54 | Arm |
| 60 | Cutting body |
| 62 | Horizontal portion |
| 64 | Vertical portion |
| 66 | Insert |
| 68 | Clamping plate |
| 70 | Screw |
| 72 | Recess |
| 74 | Upper scraper |
| 76 | Lower scraper |
| 78 | Scraper shaft |
| 80 | Actuating lever |
| 82 | Pressure cylinder |
| 84 | Stop |
| t | Angle between 32 and 28 |
| f | Angle between 36 and 28 |
| ts | Angle between 35 and 34 |
| fs | Angle between 39 and 38 |

The invention claimed is:

1. A device for removing breast cartilage from a poultry breast carcass, said device having a conveying device for moving the breast carcass along a straight, horizontal path of motion in a fixed orientation, wherein a median plane of the breast carcass is aligned perpendicularly with respect to the path of motion, a positionally fixed cutting device having a transversal blade for carrying out a transversal cut, which passes through the breast cartilage and extends in a transversal cutting plane arranged perpendicularly with respect to the median plane, wherein the transversal cutting plane encloses an angle of up to 30° with a transversal plane of the breast carcass which transversal plane is arranged perpendicularly with respect to the median plane, and having a frontal blade for carrying out a frontal cut which passes through the breast cartilage and extends in a frontal cutting plane arranged perpendicularly with respect to the median plane, wherein the frontal cutting plane encloses an angle of up to 30° with a frontal plane of the breast carcass which frontal plane is arranged perpendicularly with respect to the median plane and perpendicularly with respect to the transversal plane.

2. The device as claimed in claim 1, wherein the transversal blade and/or the frontal blade is (are) plane.

3. The device as claimed in claim 2, wherein the transversal blade and/or the frontal blade is (are) realized in a straight manner.

4. The device as claimed in claim 2, wherein the transversal blade and/or the frontal blade is arranged at an acute angle with respect to the path of motion, in particular at an angle of up to 10°, 15° or 20° with respect thereto.

5. The device as claimed in claim 2, wherein the transversal blade and the frontal blade extend from a tip pointing in opposition to the direction of movement.

6. The device as claimed in claim 1, wherein the transversal blade and/or the frontal blade is (are) realized in a straight manner.

7. The device as claimed in claim 6, wherein the transversal blade and/or the frontal blade is arranged at an acute angle with respect to the path of motion, in particular at an angle of up to 10°, 15° or 20° with respect thereto.

8. The device as claimed in claim 6, wherein the transversal blade and the frontal blade extend from a tip pointing in opposition to the direction of movement.

9. The device as claimed in claim 1, wherein the transversal blade and/or the frontal blade is arranged at an acute angle with respect to the path of motion, in particular at an angle of up to 10°, 15° or 20° with respect thereto.

10. The device as claimed in claim 1, wherein the transversal blade and the frontal blade extend from a tip pointing in opposition to the direction of movement.

11. The device as claimed in claim 10, wherein a start region adjacent the tip of the transversal blade and/or of the frontal blade is obtuse.

12. The device as claimed in claim 1, wherein the transversal blade has associated therewith a further transversal blade, which is opposite said transversal blade and is arranged converging with the transversal blade at an acute angle in the direction of movement of the breast carcass, for carrying out a supplementary transversal cut, in the transversal cutting plane.

13. The device as claimed in claim 1, wherein a mechanical entrainment device and/or scraper for moving breast cartilage, separated completely or in part from the breast carcass, in the direction of movement of the breast carcass and/or for scraping the transversal blade is arranged over and/or under the transversal blade.

14. The device as claimed in claim 13, wherein the entrainment device or scraper is coupled to a drive element which is arranged above the transversal blade and is movable by the conveying device or by the breast carcass which is moved by said conveying device.

15. The device as claimed in claim 14, wherein the drive element and the entrainment device each have radially extending arms.

16. A method for removing breast cartilage from a poultry breast carcass, comprising the step of using the device as claimed in claim 1, where the breast carcass is moved along a straight, horizontal path of motion and a median plane of the breast carcass is aligned perpendicularly with respect to the path of motion, a positionally fixed cutting device with two blades is provided, and by interaction between the moved breast carcass and the positionally fixed cutting device, a transversal cut is carried out which extends through the breast cartilage and extends in a transversal cutting plane arranged perpendicularly with respect to the median plane, wherein the transversal cutting plane encloses an angle of up to 30° with a transversal plane of the breast carcass, which transversal plane is arranged perpendicularly with respect to the median plane, and a frontal cut is carried out which extends through the breast cartilage and extends in a frontal cutting plane arranged perpendicular with respect to the median plane, wherein the frontal cutting plane encloses an angle of up to 30° with a frontal plane of the breast carcass which frontal plane is arranged perpendicularly with respect to the median plane and perpendicularly with respect to the transversal plane, wherein at least part of the breast cartilage is separated from the breast carcass.

17. The method as claimed in claim 16, wherein the frontal plane of the breast carcass is aligned vertically or within an angular range of up to 10°, 15°, 20° or 30° with respect to the vertical.

18. The method as claimed in claim 16, wherein the transversal cut and the frontal cut extend from a common starting point or a common starting line.

19. The method as claimed in claim 16, wherein a transversal cut and a frontal cut are carried out at the same time.

20. The method as claimed in claim 16, wherein there is carried out a further transversal cut, which extends in the opposite direction to the transversal cut and can extend in the same plane as the transversal cut.

* * * * *